May 9, 1950     M. A. ELLIOTT     2,506,585
METHOD OF AND APPARATUS FOR DETERMINING
THE LEVEL OF LIQUIDS
Filed May 29, 1946
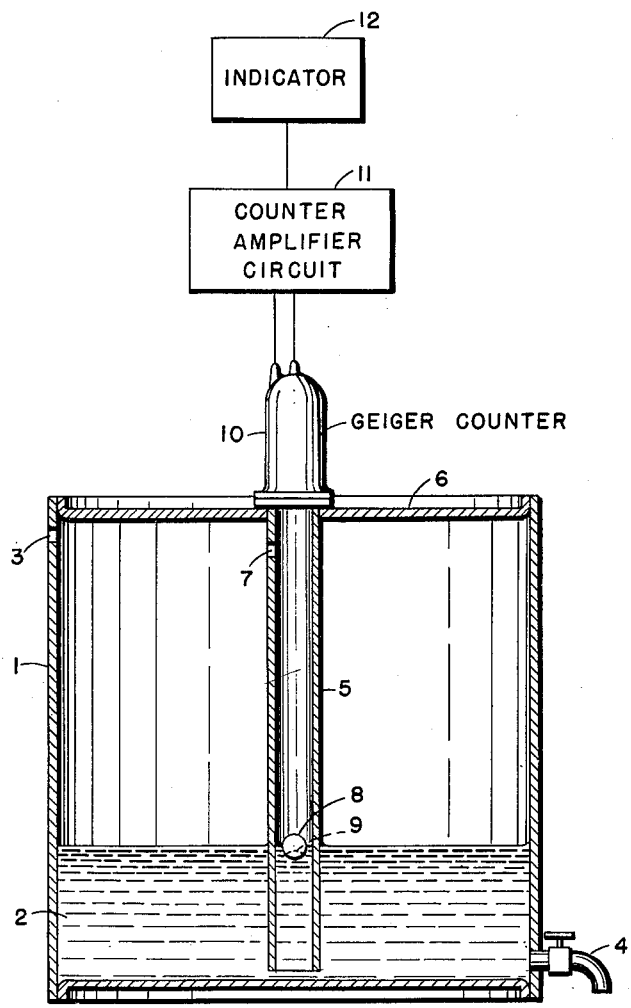
INVENTOR.
MYRON A. ELLIOTT
BY
ATTORNEY Patented May 9, 1950

2,506,585

UNITED STATES PATENT OFFICE 2,506,585

METHOD OF AND APPARATUS FOR DETERMINING THE LEVEL OF A LIQUID

Myron A. Elliott, Washington, D. C.

Application May 29, 1946, Serial No. 673,033

2 Claims. (Cl. 250—83.6)

(Granted under the act of March 3, 1883, as amended April 30, 1928; 370 O. G. 757)

This invention relates to a method of and apparatus for determining the level of a liquid and particularly the level of a liquid enclosed in a tank.

Devices for ascertaining the level of a liquid enclosed in a vessel or a tank are, of course, well known to the art. Such devices may comprise gauge glasses, or floats, or electrical systems providing remote indication. Because of the many inherent difficulties of such devices as have been available, recently efforts have been made to determine liquid level by other means. For example, in U. S. Patent No. 2,378,219 to D. G. Hare, a method and apparatus for determining the liquid level in a container is shown wherein a source of radiation, such as gamma rays, is located outside the wall of the container so that radiation will be directed into the container. The amount of scattering which takes place in a given volume of liquid is utilized as an indication of the level of the liquid in the vessel by measuring the back reflection which occurs. This device is in general useful only over a limited range of variation in liquid level and is subject to the serious objection that an extremely potent source of radiation is required since the radiation must pass through the wall of the tank, through the substance in the tank, then back through the wall of the tank into the detecting unit; thus the reflection which reaches the detecting unit will necessarily be but a small fraction of the radiation originally directed at the wall of the tank. The extremely strong source of radiation required is both dangerous to operating personnel as well as undesirably expensive.

An object of the present invention is to provide a simple and efficient method of and apparatus for determining the level of a liquid and particularly of a liquid enclosed in a tank.

In accordance with one embodiment of this invention, a guide is vertically mounted in the tank containing the liquid, the level of which is to be ascertained, and a float containing a source of penetrative radiation is located in the guide. A radiation sensitive device is located adjacent one end of the guide and is connected through suitable means to an indicating device. As the level of the liquid in the tank changes, the distance between the radiation source and the sensitive device will also change and correspondingly will produce a change in the indication provided by the indicating device.

Other objects and advantages of the present invention will be apparent from the following detailed description taken in conjunction with the drawing, wherein the single figure shows diagrammatically a tank containing a liquid and having a liquid level determining device associated therewith constructed in accordance with this invention.

Referring now to the drawing, it will be seen that a tank 1 is there illustrated containing a liquid 2. A port 3 is formed adjacent the upper end of the tank and may serve as a vent while a second port 4 is provided adjacent the base of the tank and may serve as an inlet or outlet aperture, as may be required. Substantially vertically disposed within the tank is a guide 5 which is supported at its upper end by suitable means such as a cover 6 of the tank. The lower end of the guide is open to permit the liquid in the tank to enter unimpeded and a small venting aperture 7 is formed adjacent the upper end of the guide. The guide may comprise a tube or other suitable means whereby a float 8 containing a source 9 of penetrating radiation may be constrained to move upwardly or downwardly in accordance with the level of the liquid in the tank. The float is made of a suitable size and material so that it is buoyant. It has been found that the spherical shape shown is satisfactory.

Mounted on the upper end of the tank immediately above the guide is a detection device 10 such as a Geiger-Mueller tube, which is sensitive to penetrating radiation. This tube may be connected through an amplifier 11 to a suitable indicating device 12. It will be understood that any other suitable radiation sensitive apparatus may be employed provided it is capable of indicating the changes in intensity of the radiation reaching the selected reference point, that is, the point of location of the sensitive element. It is desirable that the indicating device be sufficiently sensitive to respond rapidly to changes so as to provide a substantially instantaneous indication of any change in the level of the liquid.

As the level of the liquid in the tank changes, the distance separating the radiation source float from the detecting device will correspondingly change. The intensity of the radiation falling in the detecting device will vary inversely as the square of the distance and will increase as the radiation source approaches the detecting device. This change is indicated on the indicating device, which may be suitably calibrated to read directly the amount of liquid in the tank. In practice, it has been found that a relatively small amount of radiation producing material is required as the radiation passes unimpeded except for the wall of the float and the window of the detecting device in the case of a Geiger-Mueller tube. Thus it has been found that approximately five milligrams of radium will provide a satisfactory indication when used in conjunction with a conventional Geiger-Mueller tube and counting apparatus. While the precise material to be used to supply the radiation is not critical, it should be one which has a long half life, such as radium.

While this invention has been illustrated and described in conjunction with an apparatus wherein the sensitive element 10 is located above the liquid, it will be readily apparent that in employing this invention it would be more convenient in some instances to locate the sensitive element at the base of the liquid container, some compensation then being necessary for the effect of the liquid on the intensity of the radiation indication provided by the sensitive element as the level of the liquid changes. It is also within the scope of the invention to employ both an upper and a lower sensitive element to increase the precision with which the liquid level may be determined when in extreme positions. In this case the sensitive elements may be used independently or together in a bridge circuit, as may be required.

From the foregoing it will be apparent that in accordance with this invention a liquid level indicating device has been provided which is capable of indicating continuously the level of a liquid and which is adapted for use under conditions where the level may vary over a wide range. Although the initial cost of an installation is somewhat higher than other liquid level indicating systems, since the deterioration of the radiation source is extremely slow, the cost of the device over a long period is slight.

While but one embodiment has been shown and described, it will be understood that many changes and modifications may be made therein without departing from the spirit or the scope of the present invention, which is limited only by the appended claims.

The invention shown and described herein may be manufactured or used by or for the Government of the United States of America for governmental purposes without the payment of any royalties thereon or therefor.

What is claimed is:

1. An apparatus for determining the level of a liquid comprising a tank having vertical walls and upper and lower end walls, and adapted to contain a liquid, a source of divergent penetrating radiation, a buoyant support surrounding the same and substantially transparent to said radiation, vertically disposed guide means within the tank operative to constrain the support to a vertical path under variation of liquid level, and a device proportionately sensitive to said radiation mounted outside one of the end walls in alignment with the guide means.

2. An apparatus for determining the level of a liquid comprising a tank having an upper wall centrally apertured, the tank being adapted to receive a liquid, a source of divergent penetrating radiation, a buoyant support surrounding the same and substantially transparent to said radiation, guide means within the tank disposed vertically below the aperture operative to constrain the support to a vertical path aligned with the aperture on variation in liquid level, and a device proportionately sensitive to said radiation mounted centrally above the top wall over the aperture in alignment with the guide means.

MYRON A. ELLIOTT.

REFERENCES CITED

The following references are of record in the file of this patent:

UNITED STATES PATENTS

| Number | Name | Date |
| --- | --- | --- |
| 2,315,819 | Schlesman | Apr. 6, 1943 |
| 2,378,219 | Hare | June 12, 1945 |
| 2,401,723 | Deming | June 11, 1946 |
| 2,456,233 | Wolf | Dec. 14, 1948 |